L. W. CHUBB.
ELECTRICAL MEASURING INSTRUMENT.
APPLICATION FILED JAN. 2, 1915.
1,206,304.
Patented Nov. 28, 1916.
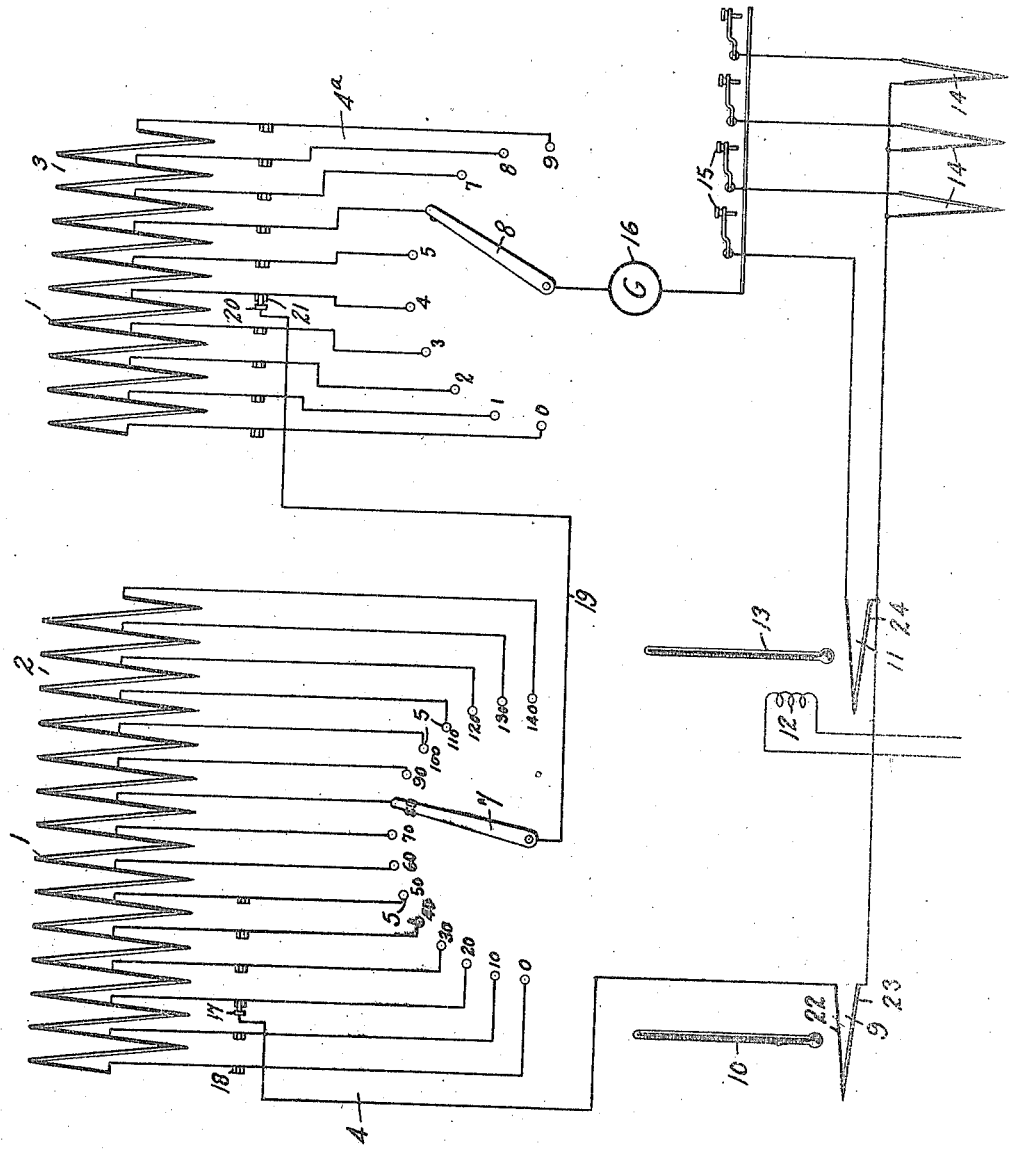
WITNESSES:
INVENTOR
Lewis W. Chubb
BY
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,206,304.

Specification of Letters Patent.   Patented Nov. 28, 1916.

Application filed January 2, 1915.   Serial No. 178.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrical Measuring Instruments, of which the following is a specification.

My invention relates to electrical measuring instruments, and particularly to thermo-electric potentiometers.

One object of my invention is to provide a thermo-electric potentiometer that may be employed in electrical measurements.

Another object of my invention is to adapt a thermo-electric potentiometer to measure the temperature of the hot junction of a thermo-couple.

Heretofore, potentiometer circuits have been provided having a potential due to an RI drop in a circuit or resistor. This requires a source of electromotive force to produce the RI drop and usually a standard cell for calibrating the same. If any appreciable current is taken from a standard cell, it will rapidly deteriorate, thus necessitating that extreme care be used in adjusting the current in the instrument.

I provide a potentiometer circuit comprising a system of thermo-couples, the hot and cold junctions of which are maintained at a predetermined difference of temperature. I provide also a thermo-couple for adjusting the potentiometer and means for determining the temperature of a thermo-couple or a member to which it may be attached.

The single figure of the accompanying drawing is a diagrammatic view of circuits constituting a thermo-electric potentiometer constructed according to my invention, and adapted to measure temperatures.

A plurality of thermo-couples 1 are arranged in two groups, 2 and 3 to constitute potentiometer circuits or conductors. The thermo-couples 1 of the group 2 are so arranged that a difference of temperature of 10° C. is maintained between the hot and cold junctions of each thermo-couple, and those of the group 3 are arranged to be maintained at a temperature difference between the hot and cold junctions of 1° C. This may be obtained either by the use of thermo-couples having these temperature differences or the group 2 may consist of ten times as many thermo-couples in series relation as there are in the group 3, and these may be maintained at one degree difference in temperature. The thermo-couples of the two groups may also be of different metals in order to obtain the correct drop along the potentiometer conductor thus constituted.

Each of a set of conductors 4 is connected, at one end, to a corresponding thermo-couple 1 of the group 2 and terminates, at its other end, in a corresponding stationary contact member of a set 5 of such members. Each of a set of conductors 4ª is connected, at one end, to a corresponding thermo-couple in the group 3 and is provided with a stationary contact member of a set 6 of such members, at its other end. The stationary contact members 5 and 6 are arranged to be engaged by movable contact members 7 and 8, respectively.

A thermal junction 9, having a thermometer attached thereto, is adapted to be maintained at the temperature of the air. A thermal junction 11, that will be designated the calibrating standard, is provided with a heating coil 12 and a thermometer 13. Thermal junctions 9 and 11 constitute the hot and cold junctions, respectively, of a thermo-couple. A plurality of thermal junctions 14 may be substituted for the thermal junction 11 after the device is adjusted, for the purpose of determining the temperature thereof. The thermo-couples 14 are disposed upon bodies or in receptacles (not shown), the temperature of which it is desired to obtain. A plurality of switches 15 are provided for connecting either the thermal junction 11 or any one or more of the junctions 14 to one terminal of a galvanometer 16 the other terminal of which is connected to the movable contact member 8. One terminal of the thermal junction 9 is provided with a plug 17 that may be inserted in any one of receptacles 18 with which the conductors 4 are provided. A conductor 19, that is connected, at one end, to the movable contact member 7, is also provided with a plug 20 that is adapted to be inserted in any one of receptacles 21 with which the conductors 4ª are provided.

In order to adjust the instrument to read the temperature of the hot junction of a thermo-couple, the standard thermal junction 11 is heated to any temperature such, for example, as 86° and the movable contact member 7 is moved to the contact member 5 that is marked 80 and the contact member 8 is moved to the contact member 6 that is marked 6, these together corresponding to the temperature of the thermal junction 11. The plugs 17 and 20 are inserted in the receptacles 18 and 21 that correspond to the temperature of the air as indicated by the thermometer 10. In this instance, we may assume this reading to be 24°, for purposes of explanation. The switch 15 corresponding to the thermal junction 11 is depressed and the lower junctions of the thermo-couples 1 are heated, by any of the well known means, to such a temperature that the galvanometer 16 shows no deflection. This indicates that the hot and cold junctions of the thermo-couples 1 are of the correct difference in temperature to cause the instrument to have the correct counter thermo-electric force.

After the device is adjusted, if it is desired to determine the temperature of any of the junctions 14, the corresponding switch 15 is depressed to connect the galvanometer 16 in circuit, and the movable contact members 7 and 8 are adjusted until no current traverses the galvanometer 16. If, as we have assumed, the plugs 17 and 20 are inserted in the receptacles 18 and 21 corresponding to the indication of the thermometer 10, the movable contact members 7 and 8 will then indicate directly the temperature of the junction 14.

The principle of operation of my invention is similar to that of the operation of an ordinary potentiometer with the exception that, instead of providing the potentiometer circuit with a potential due to an RI drop along a resistor, I provide a potentiometer circuit with a potential due to a thermo-electric force. The cold junction 9 and the hot junctions 11 or 14 are so connected to the potentiometer circuit that, when no current traverses the galvanometer 16, it indicates that the two circuits are of the same potential and in opposition. Thus, if the potential of the thermo-couples of groups 2 and 3 are known and, since in certain well known thermo-couples these differences in potential are proportional to the difference in temperature between the hot and cold junctions of the thermo-couples 1, an accurate indication of the difference in temperature between the cold junction 9 and the hot junctions 11 or 14 may be obtained.

In order to cause the device to indicate the actual temperature and not temperature differences, the indication must be increased an amount equal to the temperature of the air. This is automatically taken care of by the plugs 17 and 20 when they are inserted in the proper receptacles 18 and 21, corresponding to the air temperature when the device is being adjusted. Thus, instead of determining the temperature difference between the hot and cold junctions 9 and 14, the actual temperature of the junction 14 is obtained.

The junctions 14 may be omitted and the device may be used for determining the value of small sources of electromotive forces. This may be done by comparing the thermo-electromotive force to the source of potential to be determined, as is done in any ordinary potentiometer. Further, instead of adjusting the device by the use of a thermo-couple, a standard cell may be employed or an ordinary potentiometer may be adjusted by the use of standard junctions 9 and 11, in lieu of a standard cell.

It will be understood that the thermo-couples are constructed of two dissimilar metals and that the conductors leading from the couples are of the same metal as those parts of the couple to which they are connected. That is, for purposes of explanation, the junction 9 may be composed of an iron strip 22, and a nickel-copper alloy strip 23. This nickel-copper alloy strip extends to a nickel-copper strip 24 that comprises a part of the junction 11. The iron strip 22 extends to the plug 17. The conductors 4 may be of iron and they are connected to the iron strips constituting parts of the thermo-couples 1. It must be understood that my invention is not limited to iron and nickel-copper alloys, but this was used merely to show how the junctions formed complete couples, as it is a well known fact that a thermo-couple must comprise a hot and a cold junction.

Although I have shown and described a potentiometer having specific connections, it is evident that various modifications of the connections may be effected within the spirit of my invention, and I desire that such modifications shall be included within its scope.

I claim as my invention:

1. A measuring instrument comprising a plurality of thermo-couples so arranged as to constitute a potentiometer conductor having a plurality of equal-potential sections.

2. A measuring instrument comprising a plurality of thermo-couples so arranged as to constitute a potentiometer conductor.

3. A measuring instrument comprising a plurality of thermo-couples arranged to constitute a potentiometer conductor and means for comparing therewith the potential of an unknown source of potential.

4. A potentiometer comprising a potentiometer conductor and a thermo-couple having a thermometer adjacent thereto, said thermo-couple being so arranged as to determine the drop in potential along the said potentiometer conductor.

5. A potentiometer comprising a thermo-electric potentiometer conductor and a thermo-couple having a thermometer adjacent thereto, said thermo-couple being so arranged as to determine the drop in potential along the said thermo-electric potentiometer conductor.

6. In an electrical measuring instrument, the combination with a thermo-electric source of potential constituting a potentiometer conductor, of means for comparing an electromotive force of an unknown value with the potentiometer conductor to determine the value of the same.

7. A potentiometer comprising a thermo-electric potentiometer conductor, an electro-responsive device and means for so connecting a source of electromotive force of unknown value to such part of said potentiometer conductor and to the electro-responsive device that no current traverses the said electro-responsive device.

8. In a thermo-electric potentiometer, the combination with a plurality of thermo-couples constituting a thermo-electric source of potential, of a thermal junction maintained at substantially the temperature of the air, a second thermal junction the temperature of which is to be determined, and means for determining the difference in temperature between the air thermal junction and the second thermal junction by comparing the thermal-electromotive force generated between the same to the thermal electromotive force of the said plurality of thermo-couples.

9. In an electrical measuring instrument, the combination with a plurality of thermo-couples arranged in a series having a predetermined thermo-electromotive force between the adjacent junctions thereof, of a cold junction of two dissimilar metals substantially at the temperature of the air, a hot junction of two dissimilar metals the temperature of which is to be determined, an electroresponsive device, and means for connecting the said hot and cold junctions to the said series of thermo-couples to determine the difference in temperature between the hot and cold junctions.

10. In a potentiometer, the combination with a source of thermo-electric potential, of a thermo-couple comprising a junction maintained at substantially the temperature of the air and a hot junction the temperature of which is to be determined, and means for connecting the said thermo-couple to such parts of said source of thermo-electric potential that no current will traverse the circuit thus formed.

11. A potentiometer comprising a plurality of thermo-couples constituting a potentiometer conductor having points of predetermined potential and a thermo-couple having one junction maintained at substantially the temperature of the air and a second junction the temperature of which is to be determined, said thermo-couple being connected to such part of said potentiometer conductor that no current traverses the circuit thus constituted.

12. A potentiometer comprising a plurality of thermo-couples constituting a potentiometer conductor, a thermo-couple having one junction maintained at substantially air temperature and one junction at a temperature that is to be determined and a galvanometer, the galvanometer and the said thermo-couple being so connected in circuit with such part of the said potentiometer conductor that no current traverses the galvanometer.

13. A potentiometer comprising a plurality of thermo-couples constituting a potentiometer conductor, a thermo-couple having one junction maintained at substantially the temperature of the air and one junction at a temperature that is to be determined, a galvanometer, means for connecting the air junction to the point on the potentiometer conductor that represents the air temperature and means for connecting the galvanometer between the hot junction and a second point on the potentiometer conductor that represents the temperature of the said hot junction.

In testimony whereof, I have hereunto subscribed my name this 24th day of Dec., 1914.

LEWIS W. CHUBB.

Witnesses:
B. B. HINES,
M. C. MERZ.